Aug. 7, 1956     A. K. OZAI-DURRANI     2,758,031
METHOD FOR PROCESSING RICE PADDY

Original Filed Feb. 7, 1950     4 Sheets-Sheet 1

INVENTOR.
Ataullah K. Ozai-Durrani
BY
E. C. Sanborn
ATTORNEY

INVENTOR.
Ataullah K. Ozai-Durrani
BY
E. C. Sanborn
ATTORNEY

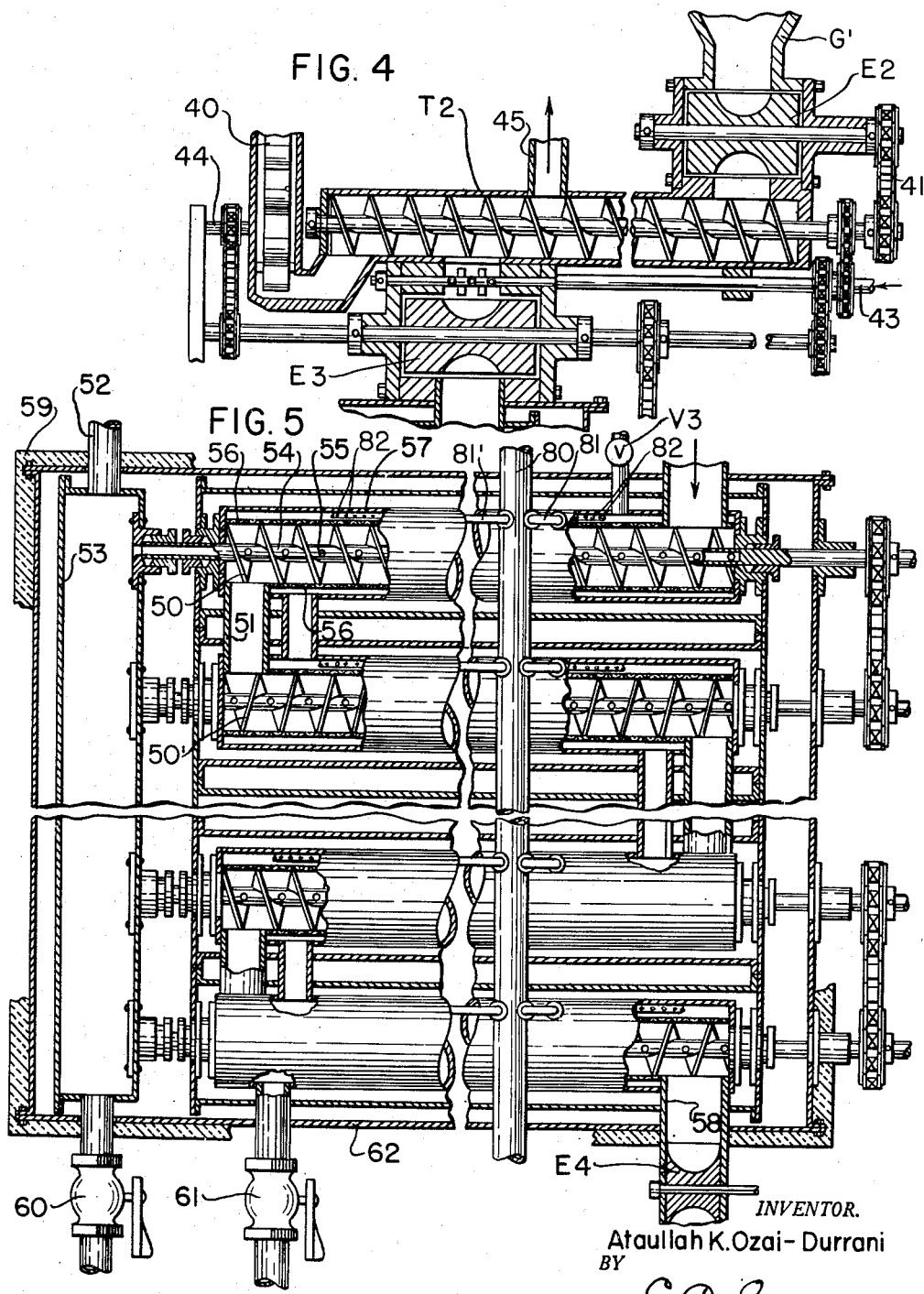

Aug. 7, 1956  A. K. OZAI-DURRANI  2,758,031
METHOD FOR PROCESSING RICE PADDY
Original Filed Feb. 7, 1950  4 Sheets-Sheet 4
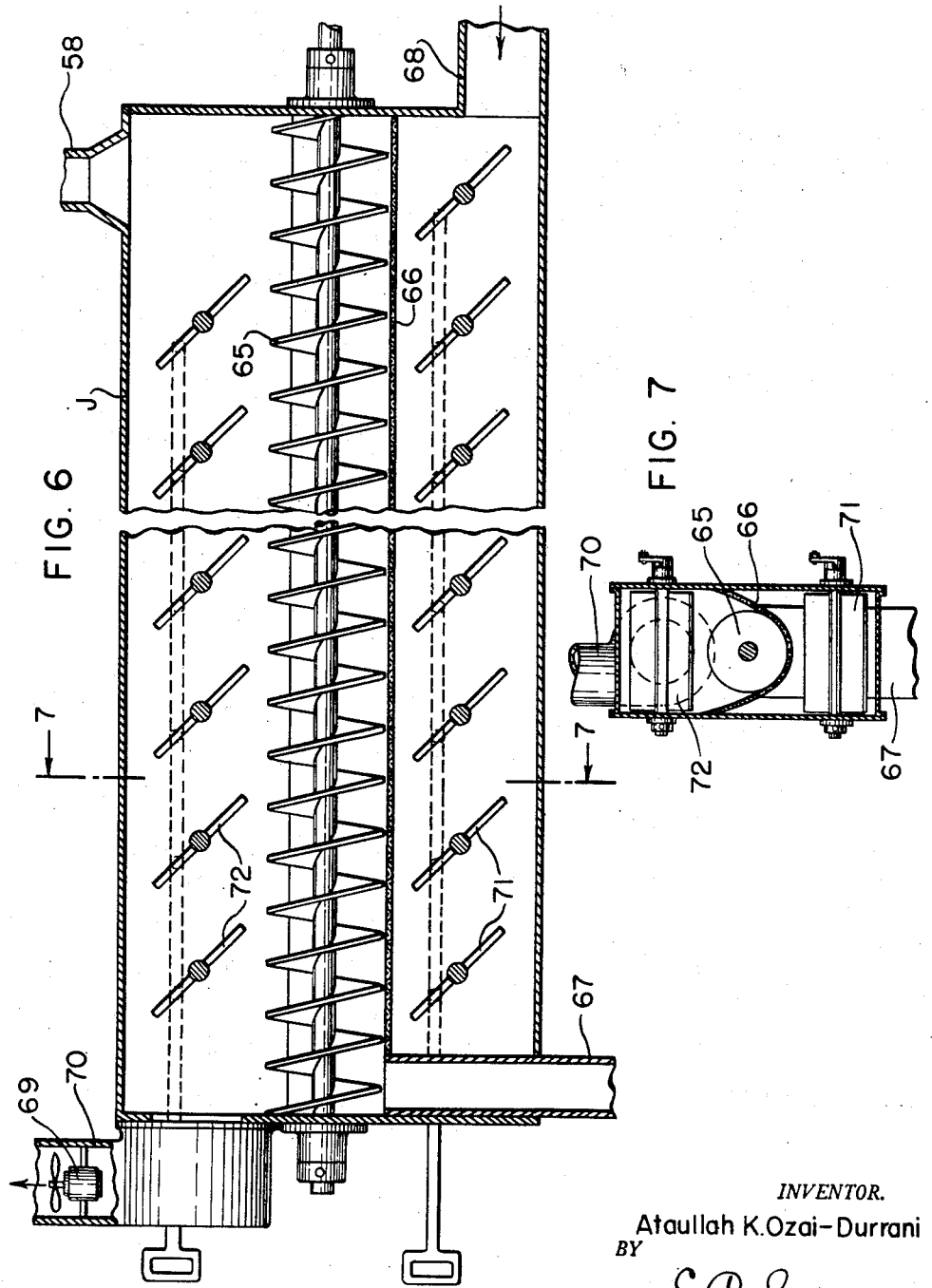
INVENTOR.
Ataullah K. Ozai-Durrani
BY
E. C. Sanborn
ATTORNEY

United States Patent Office 2,758,031
Patented Aug. 7, 1956

2,758,031

METHOD FOR PROCESSING RICE PADDY

Ataullah K. Ozai-Durrani, Stuttgart, Ark.

Original application February 7, 1950, Serial No. 142,805. Divided and this application February 1, 1952, Serial No. 270,620

11 Claims. (Cl. 99—80)

This invention relates to the art of processing rice and has for its major object the provision of a method of processing rice paddy as it comes from the harvest field to convert same relatively quickly and economically into a sterilized, enzyme-free rice paddy product in which the rice grain of the paddy is substantially whole and completely gelatinized and dehydrated to a water content of 9% to 14%, which product is capable of long time storage without deterioration and may be further processed as desired into edible rice products such as dehydrated gelatinized brown rice grains, dehydrated gelatinized polished rice grain, brown rice flakes, and the like products.

Another object is to provide an apparatus for the practice of the said method of processing rice paddy.

Still another object is to produce efficiently a gelatinized and dehydrated brown rice product which is capable of long term storage without deterioration and which is capable of being further processed, at will, into a plurality of other desirable rice products.

Other objects of the present invention will be apparent as the invention is more fully hereinafter disclosed.

In accordance with these objects I have devised an improved method of processing rice paddy as it comes from the field to convert the same, in a relatively short time interval, into a sterile, enzyme-free rich paddy product having a dehydrated gelatinized rice grain which is capable of being held in long term storage without deterioration and which may be de-hulled and rehydrated and processed further into a plurality of desirable edible rice products, and an apparatus for practicing the said method, all as will hereinafter be more fully disclosed.

The present improved method is based on my discovery that when the natural moisture content of the rice grain as it comes from the field has been reduced to below a critical percentage approximating 17% to 18% the internal structure of the grain undergoes a change or transformation that differentiates the grain physically from rice grains having a natural moisture content of 18% to 28% and that before this rice grain can be effectively gelatinized the internal moisture content of the grain must be increased, by water absorption, to a saturation percentage of about 29%.

On the other hand, when the natural moisture content of the rice grain as it comes from the field is above the critical percentage range of 17% to 18% and within the range 18% to 28% the rice grain may be effectively gelatinized without increasing the moisture content of the grain by absorption prior to gelatinization.

By "gelatinization" is meant to define that reaction with water which results in the conversion of the starch granules of the grain into an edible gelatinized product, such as is normally obtained on cooking the rice grain. Usually, gelatinization of the rice grain proceeds at temperatures above about 60° C. when the grain is exposed to water or to a steam atmosphere.

I have further discovered that where it is necessary to increase the water content of a rice grain having a natural moisture content of less than the critical percent of 17% to 18% in order to condition the grain for gelatinization, the time interval of soaking the grain in water is materially shortened and reduced to about one-half that heretofore found necessary, when the grain is preheated, prior to soaking in cold water, preferably in a steam atmosphere, to a temperature approximating 100° C. for a time interval effective to expand the grain to open the pores of the grain and to drive out of the grain interior substantially all gases contained therein, and thereafter rapidly cooling the grain by quenching in cold water before or on immersion of the grain in the soak water and that when so pre-heated and rapidly cooled the temperature of the soak water may be as high as 40° to 50° C. without accompanying detrimental results.

Heretofore in the art, it has been proposed to soak the rice grain in cold water for an extended time interval of from 10 to 15 hours to condition the grain for gelatinization. By the practice of the present pre-heating and quench operation, I reduce this time interval to from 5 to 8 hours depending somewhat on the kind of rice grain and upon the temperature of the soak water.

In view of these discoveries I have devised an improved method of processing rice paddy as it comes from the field in which the paddy which has a natural moisture content of less than 17% to 18% is pre-heated in a live steam atmosphere at 100° C. for a time interval of 5 to 15 seconds, that is required to sterilize the hull of the paddy and to destroy the enzymes present in the bran and polish coatings of the rice grain and to expand the grain, opening the pores of the grain and removing the air and other gases from the grain interior, following which the paddy is cooled rapidly, by quenching in cold water, and immediately immersed in the soak water which may have a temperature within the range 20° to 50° C. but preferably has a temperature approximating 40° C., wherein the paddy remains for a period of 5 to 8 hours and until the moisture content of the rice grain approximates the saturation percentage of 29%.

Then the paddy is removed from the soak water, surface dried, and held for a determined time interval required to obtain a uniform dispersion of the absorbed water throughout the grain, the water soaked grain is gelatinized by exposure to steam at a pressure above atmospheric pressure, and preferably within the range 5 to 15 pounds pressure, at a gelatinizing temperature which preferably is within the range 90° to 120° C. for a time interval required to substantially completely gelatinize the rice grain and to provide a moisture content therein of about 35%.

Then the paddy is rapidly cooled to a temperature below 60° C. and preferably to a temperature of 40° to 50° C. by a cold air blast and the gelatinized and cooled rice grain of the paddy is dehydrated by drying in a current of warm, dry air having a temperature not in excess of 50° C. to a moisture content of 9% to 14%.

The resultant sterile, enzyme-free, rice paddy, containing the gelatinized rice grain dehydrated to a moisture content of 9% to 14%, may be stored indefinitely without deterioration and may be further processed into other desirable rice products all as will be more fully disclosed.

As a modification of this method I have devised an alternative method for processing rice paddy containing rice grains having a moisture content of about the said critical percentage of 17% to 18%.

In this alternative process the pre-heating, quenching and soaking steps of the above described method may be dispensed with and the paddy after surface drying at temperatures approximating 100° C. may be gelatinized substantially as above described without prior soaking by heating the paddy in a steam atmosphere at a pressure above atmospheric pressure, and at a temperature within the range 90° to 120° C. for a time interval required to substantially completely gelatinize the rice grain and to sterilize the paddy and destroy the enzymes present therein, following which the paddy is cooled rapidly to 40° to 50° C. by a cold air blast and is dried and dehydrated in a current of warm, dry air, substantially as described hereinabove in connection with the first method, to a final moisture content of 9% to 14%. Normally, I have found that upon substantially complete gelatinization of a rice grain containing from about 18% to 28% natural moisture in the manner described the moisture content of the gelatinized grain is approximately 6% to 8% higher than that originally present in the grain.

Before further disclosure of the method invention reference should now be made to the accompanying drawings wherein apparatus designed for the practice of the said method is illustrated. In the drawings:

Fig. 4 is an enlarged sectional view of another transfer mechanism between successive apparatus elements;

Fig. 5 is an enlarged view partly in section of a second apparatus element into which the transfer mechanism of Fig. 4 discharges, which apparatus element hereinafter will be identified as the gelatinizer;

Fig. 6 is an enlarged sectional view of a third apparatus element hereinafter referred to as the cooling chamber or cooler; and Fig. 7 is a sectional view of the same taken along plane 7—7 of Fig. 6.

Referring to Figs. 1 to 7, inclusive, the apparatus invention of the present invention consists of a combination of new and old apparatus operatively connected by new and old transfer mechanisms into a cooperating combination of elements of wide operating flexibility especially adapting the combination for the practice of the above described method in its alternative forms with the new elements of the combination adapted for wider utility in the art of processing rice paddy and rice grains.

Figure 1:
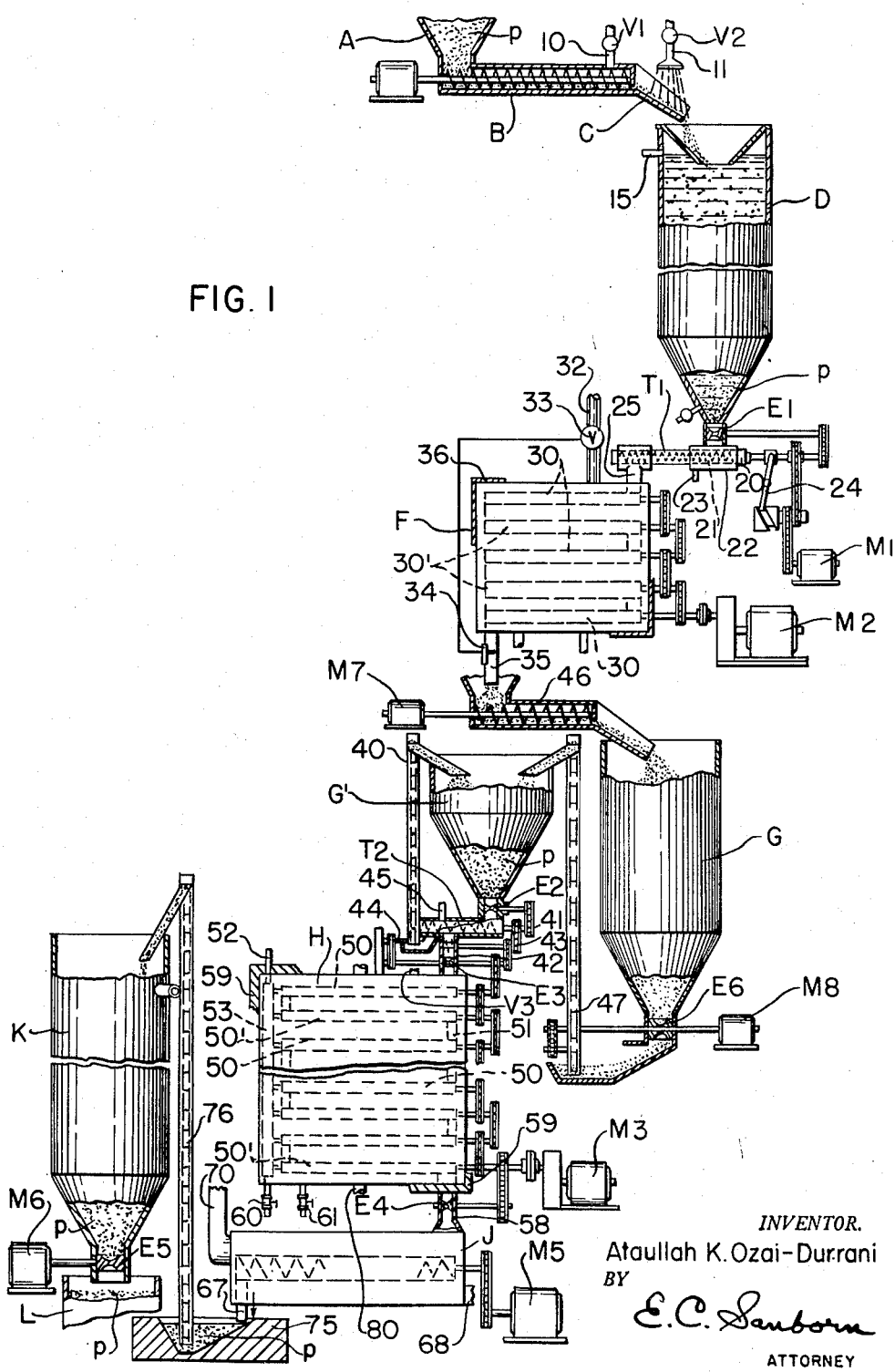
Fig. 1 is a schematic diagram illustrating all of the apparatus elements of the apparatus combination in their proper cooperating relationship.

In the schematic diagram of Fig. 1, the combination of apparatus elements and transfer means shown consists of a storage bin A having a conical bottom feeding the rice paddy $p$ disposed therein to a screw conveyor means B for delivery to chute C, from which chute C the paddy falls into soaking tank D. Just prior to the discharge of the paddy $p$ from the conveyor B onto the chute C the paddy $p$ is pre-heated by a jet of steam under a pressure of 5 to 10 pounds injected into the conveyor housing through pipe 10, the amount of said steam being regulated by the valve $V_1$. As the paddy pre-heated by the said steam is delivered onto chute C it is sprayed with cold water from sprayer 11, the amount of water delivered by the sprayer 11 being regulated by valve $V_2$.

The precise location of steam inlet pipe 10 relative to the end of the conveyor B may be widely varied without essential departure from the invention, and the precise location and manner of introducing the steam may also be widely varied to attain the object of the present invention. This object is to pre-heat the paddy sufficiently to sterilize the paddy hull and to kill the enzymes while heating the rice grain enclosed by the hull to a temperature that is effective to open the pores of the grain and to expel the air from the grain interior without substantial gelatinization of the grain surface. This general result is obtained in a relatively short time interval of 10 to 20 seconds exposure to the steam. As soon as this objective is obtained the paddy should be quenched by cold water and immersed in the soak water in soaking tank D.

My researches have indicated that by so sterilizing the paddy and killing the enzymes present in the bran and polish coatings, the paddy thereafter may be soaked in water without deterioration or loss of vitamin and mineral content and that the time interval of soaking to attain an absorbed moisture content within the rice grain approximating its saturation percentage, or about 29%, is materially shortened and consistently reduced to a time interval of 5 to 8 hours.

I therefore have designed soaking tank D for continuous operation practices, providing therein a height and diameter which with the rate of feed of paddy thereinto will contain the amount of paddy delivered thereinto over a 5 to 8 hour period without filling to capacity. The specific capacity of soaking tank D may therefore vary widely without essential departure from the invention as one skilled in the art will recognize.

Figure 2:
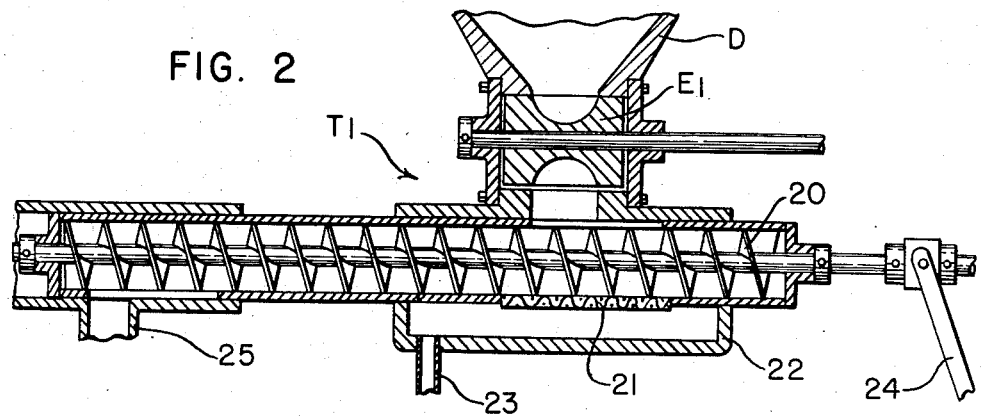
Fig. 2 is an enlarged sectional view illustrating one transfer mechanism between successive apparatus elements.
Figure 3:
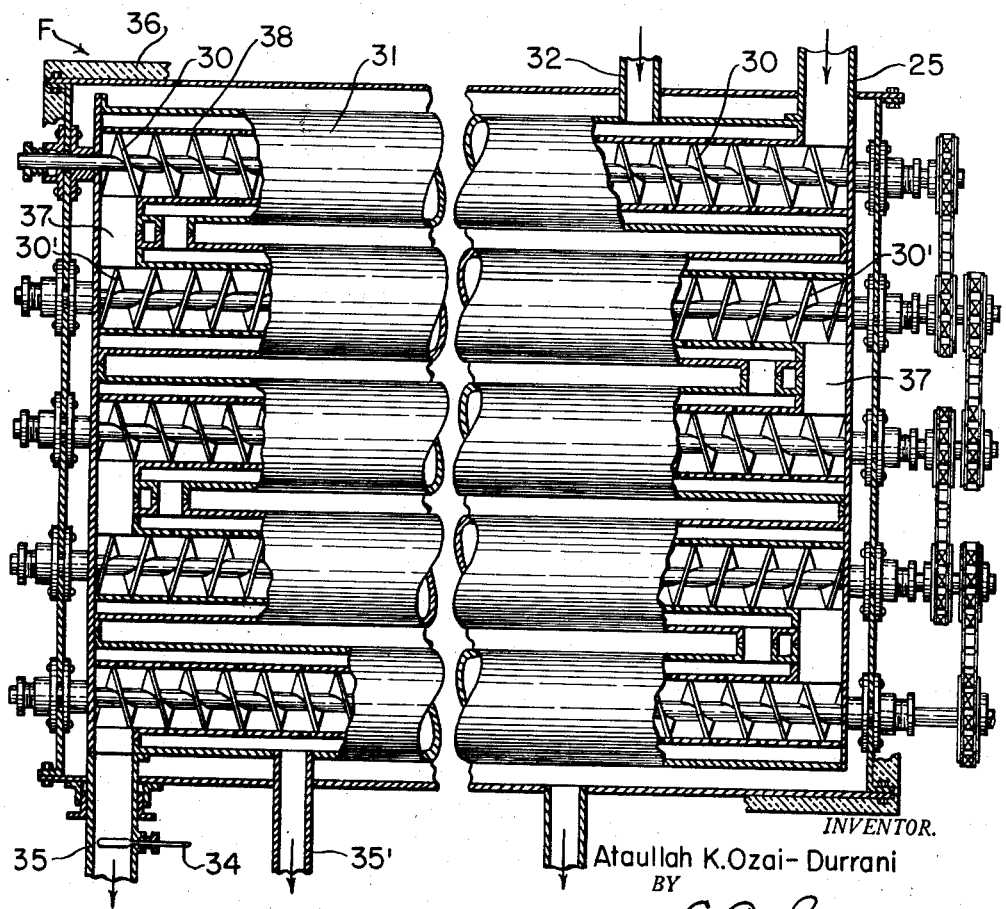
Fig. 3 is an enlarged sectional view of the apparatus element into which the transfer mechanism of Fig. 2 discharges, which element hereinafter will be referred to as a steam drier.

However, the problem of continuously removing the soaked paddy from the soaking tank at a rate substantially identical to the rate of feed of pre-heated and quenched paddy thereinto remains and is met in the apparatus shown by the transfer mechanism $T_1$ indicated in Fig. 1 and shown in enlarged section in Fig. 2.

In this arrangement the bottom of the tank D is made sharp angle conical, substantially as indicated so that the paddy settling downwardly in the tank is gravitationally directed towards the apex opening therein and to a rotating double-cup valve $E_1$ enclosing said apex opening. Valve $E_1$ is rotated by the rotating means indicated at such a rate as will discharge the soaked paddy from the tank D at substantially the same rate the pre-heated and quenched paddy is fed into the top of the tank D.

This rotating double-cup valve $E_1$ is old, per se, and forms no part of the invention except in combination with the remaining apparatus elements of the combination of the present invention.

Valve $E_1$ discharges the soaked paddy withdrawn from tank D into the transfer mechanism or means $T_1$, wherein it is received by screw conveyor 20 rotating within screen 21 enclosed by housing 22 provided with drainage opening 23 in the bottom thereof, the said conveyor 20 during rotation being vibrated or jarred by jarring means 24 to facilitate the drainage of all but surface adsorbed water from the paddy during transit of the paddy by the conveyor 20 to discharge chute 25 delivering the paddy into steam drier F, all as illustrated more particularly in enlarged section in Fig. 2. Other means for receiving the wet paddy from the tank D and removing the associated free water therefrom while or before feeding the paddy to the drier F may be substituted for the means $T_1$ without departure from the present invention, the means $T_1$ being shown for purposes of illustration but not by way of limitation.

The wet paddy $p$ after discharge from the transfer means $T_1$ falls gravitationally into steam drier F wherein it is received on a series of forward and reverse screw conveyors 30—30' sustained in alternate horizontal spaced relationship in vertical alignment with chutes 37 connecting the discharge and feed ends of adjacent conveyors connecting the same in series, each of said conveyors being enclosed by a tube 38 and surrounded by tube 31 sealing the series connected conveyors from the atmosphere, the said assembly being enclosed by thermally insulated housing of the drier F. Steam from supply pipe 32 through thermostatically controlled valve 33, is fed into the tube 31, the operation of which valve 33 is under the control of thermo-sensitive element 34 disposed in the discharge chute 35 gravitationally discharging the steam-heated paddy from the steam drier F. In this steam drier F the wet paddy delivered thereinto by the means $T_1$ is contacted with surface heated to a temperature substantially above 100° C. for a time interval effective to remove the surface adsorbed water of the paddy hull. Evaporated water escapes through the tube 25. The paddy discharges through the discharge chute 35. To attain this result the plurality of conveyors 30—30' are substantially identical except for the direction of feed and are driven at substantially the same rate by the chain and sprocket connections indicated by means of a variable speed motor $M_1$ and a rate of speed is selected with any given rate of feed of wet paddy thereinto that is adapted to carry the paddy through the steam drier in the minimum time to attain this result. This time interval of passing through the drier F usually approximates 2 to 3 minutes.

The exterior of the steam drier F is thermally insulated by insulation 36 to reduce heat losses to the minimum and the thermo-sensitive element 34 is employed to control the amount of steam entering the drier to that required to maintain a paddy temperature of 50°-60° C. in the chute 35.

The valve means 33 and the thermo-senstive control means 34 are each old, per se, and in combination, and form no part of the present invention except in combination with the remaining elements of the invention.

The surface dried paddy discharged from the steam drier F is fed into a thermally insulated holding tank G, as by means of a screw conveyor means 46 actuated by variable speed motor $M_7$, wherein it is allowed to remain for a period of time ranging from ½ to 2 hours within which uniform dispersion of the absorbed water throughout the grain is obtained.

The paddy is continuously removed from the conical bottom of the holding tank G at a substantially constant rate approximating the rate of feed into the tank in any convenient manner, as by means of the rotating cup valve $E_6$ actuated by variable speed motor $M_8$ and is fed, as by means of the lift conveyor 47 of common design into the hopper tank G' from which it is withdrawn at a substantially constant rate for delivery to the gelatinized H.

Hopper tank G', interposed between the holding tank G and the gelatinizer H has been found to be advantageous as a means of preventing discoloration of the rice grains through over-heating by the steam escaping from the gelatinizer.

The bottom of this tank G' is also conically shaped at such an angle as will insure the gravitational settling of the rice paddy therein towards the apex opening in the bottom of the tank and the rice paddy p is continuously withdrawn from the tank by means of revolving double-cup valve $E_2$ substantially identical in size to previously identified valve $E_1$ and from the valve $E_2$ the paddy is delivered to transfer means $T_2$ for delivery to the gelatinizer H.

Referring to Fig. 4 the details of the transfer means $T_2$ may be noted. This means includes a screw conveyor 41 receiving the surface-dried soaked paddy from the valve $E_2$ and conveying it over to discharge chute 42 wherein is disposed air agitator 43 which breaks up the paddy into single grains before passing the paddy therethrough to rotating double-cup valve $E_3$. The excess paddy carried by conveyor 41 over that filling the chute 42 is discharged from the end of the conveyor into chute 44 wherein it is carried onto lift conveyor 40 for return to tank G', substantially as indicated. Lift conveyor 40 is of standard design and is old, per se, and forms no part of the present invention except in combination with the means T and tank G and with the remaining elements of the combination.

The rotating valve $F_3$ discharged the paddy into the gelatinizer H at a substantially constant rate of feed. The gelatinizer H consists of a plurality of forward and reverse conveyor 50—50' sustained in alternate horizontal spaced relation in vertical alignment with connecting chutes 51 therebetween connecting the discharge and feed ends of the conveyor in series to carry the paddy fed to the first conveyor by the valve $E_3$ through the gelatinizer at a determined rate under the control of variable speed motor $M_3$ through the chain and sprocket connection shown.

Live steam at a determined head of pressure is fed into the gelatinizer through pipe 52 and passes into header 53 as indicated in enlarged section in Fig. 5, and from header 53 into the hollow shaft 54 of each conveyor 50—50' and through a plurality of openings 55 in the said hollow shaft 54 over and through the paddy grains carried along by the conveyors 50—50' and through screen 56 into the space gap provided between screen 56 and outer hermetic tube 57 enclosing each conveyor 50—50' from the atmosphere.

With this arrangement it will be seen that the steam entering each conveyor 50—50' through the openings 55 is retained by tubes 57 and the steam pressure within the tubes 57 is substantially the same as that in header 53. A pressure relief valve $V_3$ of standard design is provided for safety.

The steam rice paddy as it reaches discharge chute 58 falls gravitationally into rotating double-cup valve $E_4$ sealing the opening from the atmosphere and is continuously discharged from the chute by valve rotation along with some steam. Valve $E_4$ is rotated by variable speed motor $M_3$ through the chain and sprocket connection shown at a rate relative to the rate of feed of paddy into the gelatinizer as to prevent the rice paddy from piling up in the chute 58.

The rate of feed of rice paddy into and through the gelatinizer H is regulated to provide the minimum time interval of exposure of the paddy to the gelatinizing action of the steam at the temperature and pressure of the steam. Normally with steam at 100°-110° C. temperature and 5 to 10 pounds pressure the rate of feed of the paddy through the gelatinizer is regulated to provide a time interval of 6 to 8 minutes which has been found to be sufficient to obtain substantially complete gelatinization of the rice grain with limitation of the absorbed moisture content of the gelatinized grain to about 35%. The precise pressure of the steam may be widely varied without essential departure from the present invention from as low as one (1) pound to as high as 100 pounds with proper adjustment of the strength of materials to hold the pressure. However, I have found a pressure of 5 to 15 pounds adequate for my purposes. The general effect of higher steam pressure is to shorten the time interval of exposure of the paddy for gelatinization and 6 to 8 minutes exposure has been found commercially practical.

The gelatinizer H is exteriorly well insulated with thermal insulation 59 to eliminate heat losses and petcock closed drainage openings 60 and 61 are provided in the bottom of the header 53 and in the bottom of the housing 62 enclosing the plurality of horizontally aligned tubes 57 from the atmosphere for the intermittent drainage of condensed steam therefrom.

The gelatinized paddy gravitationally discharged from valve $E_4$ falls through a continuation of the chute 58 into cooler J wherein, as shown in Fig. 6, it falls into screw conveyor 65 enclosed by screen 66 and conveyed to discharge chute 67 and during conveyance is cooled rapidly by a blast of cold air drawn in through inlet 68 by fan means 69 located in exhaust outlet 70, the rate of flow of air and its dispersion along the length of the conveyor 65 being regulated by manually operated vanes 71 and 72.

The rate of flow of the cold air in the cooler J is controlled such as to cool the gelatinized rice paddy from its discharge temperature of about 100° C. to a temperature below 60° C. and preferably to a temperature of 40° C. as rapidly as possible during its transit the length of conveyor 65, and the rate of feed of the conveyor 65 is regulated by the variable speed motor $M_5$ to correspond to the rate of feed of paddy into the cooler so as to prevent any delay in subjecting the paddy to the cooling result desired.

The cooled paddy discharged from the cooler J falls into a chute 75 conducting the paddy to the lift conveyor 76 of common design, which feeds the paddy continuously into the drier K wherein it is subjected to the drying effect of a blast of warm, dry air until the moisture content of the gelatinized grain has been lowered from 35% to a value within the range 9% to 14%. The dehydrated gelatinized paddy collects in the bottom of the drier K substantially as indicated and is continuously removed therefrom at a rate approximating the rate of feed thereinto by means of the double rotating double-cup valve $E_5$ actuated by variable speed motor $M_6$, and discharged therefrom into storage bin L.

The particular type of drier K employed may be widely varied without essential departure from the invention, as one skilled in the art will recognize, and many different types of driers utilizable as element K of the present invention are available in the art. Drier K therefore, per se, forms no part of the present invention except in combination with the remaining elements thereof.

As one specific embodiment of the practice of the present invention in the apparatus designed therefor I will first describe the invention as employed in the processing of rice paddy having rice grains containing a natural moisture content of less than the critical percentage of 17% to 18%.

The rice paddy $p$ is first treated to separate the paddy from associated straw, hulls, broken rice grains, etc., by methods and practices old in the art and, per se, not forming a part of this invention and the cleaned paddy is fed into the bin A from which it is withdrawn at a determined rate by means of screw conveyor B for delivery into soaking tank D and is pre-heated as it passes to the soaking tank D by steam from steam pipe 10 to a temperature of 90° to 120° C. for a time interval approximating 15 seconds to sterilize the paddy and to destroy enzymes present therein while heating the rice grain of the paddy sufficiently to open the pores of the grain and to drive out substantially all of the air and other gases from the grain interior but not above a temperature of about 50° C.

As the pre-heated paddy is delivered to chute C a spray of cold water from spray pipe 11 is encountered which cools the rice paddy rapidly to a temperature below 60° C., at least superficially, and washes the paddy down the trough or chute C into the soaking tank D.

The soaking tank D is filled with water to the level of overflow valve 15 and the botom of the tank D is conically shaped, substantially as indicated, to direct the paddy at it settles downwardly in the tank towards apex chute opening leading to rotatable valve $E_1$.

As hereinabove disclosed the pre-heated and quenched paddy requires a soaking time of about one-half that required by the paddy without pre-heating and quenching, to attain an absorbed moisture content of about 29%, quired for the paddy in the present invention is within the saturation percentage, and the soak time interval required for the paddy in the present convention is within the range 5 to 8 hours where the temperature of the soak water in tank D is within the range 20° to 40° C.

Accordingly, the pre-heated and quenched paddy is fed into tank D for a period of about 5 hours before rotation of valve $E_1$ is initiated to withdraw the soaked paddy from the tank D and the size of the valve $E_1$ and its rate of rotation are designed and adjusted to synchronize the rate of removal of the paddy from the tank D with the rate of feed of the pre-heated and quenched paddy into the tank D, so that continuous operation of the apparatus may be obtained.

After the soaked paddy has been removed from the tank D by the rotating valve $E_1$, the paddy is fed onto the vibrating screw conveyor 20 enclosed by screen 21 wherein substantially all excess water except surface adsorbed water is removed and drained off during the passage of the paddy to steam drier F.

In the steam drier F the surface of the paddy is heated to a temperature of 100° C. to 110° C. during its passage through the drier for a time interval approximating 2 to 3 minutes which is effective to convert all surface adsorbed water into steam vapor and raise the temperature of the rice grain to 40° to 60° C.

From the steam drier F the paddy falls into thermally insulated holding tank G wherein the dry paddy remains for a holding time of ½ to 2 hours at a temperature within the range 40° to 60° C. to obtain a uniform dispersion and distribution of the absorbed water content of the rice grain throughout the grain.

The bottom of holding tank G is also conically shaped to direct the paddy therein towards rotatable valve $E_6$ in the bottom apex opening therein. The paddy then is fed by the lift conveyor 47 into the hopper tank G' from the bottom of which it is withdrawn by the valve $E_2$. The valve $E_2$ delivers the paddy to the screw conveyor 41 and by the conveyor 41 to the agitator 43 and thence into valve $E_3$ and to the gelatinizer conveyors 50—50'.

The size of the valve $E_3$ and its rate of rotation are selected with respect to the rate of feed of the surface-dried paddy into the hopper tank G' such as to remove the paddy from tank G' at substantially the same rate it is delivered thereinto.

The paddy is fed into the gealtinizing chamber H through valve $E_3$ onto the conveyors 50—50' for movement therethrough and the steam escaping through the valve $E_3$ countercurrent to the passage of the paddy therethrough is exhausted through vent tube 45, such as by means of an exhaust fan (not shown).

The paddy remains in the gelatinizing chamber H for from 5 to 8 minutes, usually about 6 minutes, where the steam pressure is 5 to 10 pounds, and is discharged continuously therefrom at a substantially constant rate into the cooler J wherein it is cooled to about 40° C. by the blast of cold air passing therethrough before discharge into chute 75 for transfer by lift conveyor 76 into the drier K.

In the drier K, the dehydrating of the gelatinized grain to a moisture content of 9% to 14% from a moisture content of about 35% usually requires 2 to 3 hours but may vary somewhat depending upon the temperature of the air, its dryness, and its rate of flow through the drier and the capacity of the drier K is selected to take care of any such variations in time interval automatically.

The drying or dehydrating of the gelatinized paddy to a water content of 9% to 14% is important for storage purposes as my researches have indicated that the storage properties of the gelatinized grain is best at this percent of contained water.

Moreover, the dried paddy at this percent water content is in proper condition for passing the paddy through the shellers for the removal of the hull and for passing the de-hulled grain through the huller rolls for the removal of the bran and polish coatings, if that is desired.

One of the major advantages of the present invention over other methods of processing the rice paddy is that by subjecting the rice paddy substantially immediately after harvesting to processing in accordance with the present invention the paddy is sterilized and deterioration of the rice oil content of the bran and polish coatings by enzyme reaction is substantially completely eliminated with the result that the dehydrated gelatinized paddy may be stored for extended periods of time without deterioration.

The prevention of rice oil deterioration by enzyme reaction provides, on de-hulling the paddy, a brown rice product in which the rice oil of the bran and polish coatings is substantially free of fatty acids, improving the food value of the brown rice product.

Moreover, my researchers have shown that by the practice of the present invention substantially all of the vitamin and mineral content of the rice paddy is retained by the rice paddy and is carried over intact into the dehydrated gelatinized paddy.

Another major advantage of the present invention is that losses in fractured grains during de-hulling and the removal of bran and polish coatings from the rice grains are substantially completely eliminated for the reason that the dehydrated gelatinized grain is strong and elastic and resists fracture during milling operations. As the usual milling losses amount sometimes to as much as 20% this advantage is considerable.

Moreover the milling process is considerably facilitated by the present invention, the dried hull of the gelatinized and dehydrated grain readily parting from the dehydrated gelatinized grain and the absence of fatty acids in the bran and polish coatings facilitating the removal of these coatings.

Another and major advantage is that the dehydrated brown or polished, dehydrated gelatinized rice product may be readily re-hydrated by soaking in cold water for a relatively few minutes and heating to prepare same for eating.

Other advantages of the present invention, method and apparatus will be apparent to those skilled in the art.

As a second specific embodiment of the invention, rice paddy in which the natural moisture content of the grain exceeds the critical range of 17% to 18% and is any percentage within the range 18% to 28% may be processed in the following manner:

The rice paddy free of extraneous matter (stalks, broken grains, etc.) is preferably passed relatively rapidly from the bin A to and through the surface drier F to dry the hulls and to pre-heat the rice grain thereof to a temperature approximating 40°–50° C. and are deposited in the holding tank G as above described.

From the holding tank G the warm dry paddy is fed at a substantially uniform rate into the gelatinizer H, as hereinabove described, and is moved therethrough at a rate providing substantially complete gelatinization of the rice grain before discharge therefrom into chute 58 to valve E4. This time interval may vary somewhat with variation in the natural moisture content of the rice grain and with the size and kind of rice grain and, in general, the higher the natural moisture content of the grain the less time is required for complete gelatinization at any given temperature and pressure of steam in the gelatinizer. However, where the steam pressure is within the range 10 to 15 pounds, as is preferred, and the temperature is 100° to 110° C., the variation in time interval for gelatinization is very slight and gelatinization of the grain may be obtained in the usual time interval of 5 to 8 minutes as in the first specific embodiment. Gelatinization under these conditions usually increases the moisture content of the rice grain from 6% to 8% above the natural moisture content and the final gelatinized product after dehydration as above described appears substantially identical to the product obtained in the first specific embodiment, no appreciable differences having been noted.

It is believed apparent that the gelatinizer H is adapted to wide utility in the art of processing rice as a continuous steamer device of great flexibility in operation and use. In addition to its use as herein described as a gelatinizer for the rice paddy, the device or means H may be employed as a re-hydrator for previously gelatinized and dehydrated rice grain or paddy. It may also be employed in the preparation of quick-cooking rice wherein the rate of feed of the rice grains through the steamer device is regulated to gelatinize the rice grain inwardly from the surface a determined distance only.

To adapt the device H for such plurality of different uses I have provided therein a means for flushing the conveyor system with cold or hot water as may be desired. This means consists of a water header 80 (Fig. 5) extending the full height of the device through which water under the usual pressure is circulated. From the header 80 at each horizontal level of the conveyors 50—50' extend feed pipes 81—81' which pass through the tubes 57 and into the space gap between the tube 57 and perforated tube or screen 56, preferably at the highest horizontal level, substantially as shown and extends the full length of the tube 57. A plurality of outlet openings 82 are provided along the enclosed length of the feed pipes 81—81' through which the water may be sprayed into the tubes 57 for flushing out the conveyor system, petcock 61 being opened to permit the water to drain out.

It is believed apparent from the above disclosure of the method and apparatus of the present invention that the same may be widely varied without essential departure therefrom and all such modifications and departures are contemplated as may fall within the scope of the following claims.

What I claim is:

1. The method of processing rice paddy which comprises surface drying the paddy while heating the rice grain to a temperature of 40° to 50° C. and heating the pre-heated paddy to a temperature within the range 60° to 120° C. in a steam atmosphere under a pressure of 1 to 100 pounds for a time interval required to gelatinize the rice grain substantially completely, rapidly cooling the gelatinized rice paddy to below 60° C., and dehydrating the gelatinized grain of the cooled paddy to a moisture content of 9% to 14%.

2. The method of claim 1, wherein the rice grain of the said paddy has a natural moisture content of less than 17% to 18% and wherein the paddy is first pre-heated to a temperature of 90° to 110° C. for a relatively short time interval sufficient to sterilize the hull and to kill enzymes present in the bran and polish coatings without heating the rice grain to a temperature above 60° C., and is cooled rapidly and soaked in water having a temperature within the range 20° to 50° C. for a time interval providing for the absorption of water to an amount approximating the saturation percentage of the rice grain prior to surface drying and steam-heating the said paddy.

3. The method of claim 1, wherein the said paddy where the rice grain thereof has a natural water content of less than 17% to 18% is heated by a steam blast rapidly to 90° to 110° C. for a time interval not in excess of that heating the rice grain thereof to 40° to 50° C., is then quenched in water to cool it rapidly and then is soaked in water at 20 to 40° C. for from 5 to 8 hours to impart a total water content of about 29% to the rice grain of the paddy before surface drying and steaming as recited by the claim.

4. The method of processing rice paddy having a natural moisture content of less than 17% to 18% immediately after harvesting which comprises feeding the rice continuously through a heating zone and a cooling zone to superficially pre-heat the rice paddy relatively rapidly to a temperature within the range 90° to 110° C. for a time interval not in excess of that heating the rice grain to 40° to 50° C., immersing the paddy in water at a temperature of 20° to 40° C. for a time interval of 5 to 8 hours to increase the moisture content of the rice grain of the paddy to its saturation percentage of about 29%, removing the paddy from the water and surface drying the paddy at a temperature of 100°–110° C. for a time interval not over that heating the rice grain to 50° C., holding the surface-dried rice paddy for a time interval permitting the absorbed water content of the rice grain therein to disperse substantially uniformly, and feeding the paddy continuously through a steam atmosphere at a temperature of 90° to 110° C. and at a pressure of 5 to 15 pounds at a rate providing a time interval of heating of approximately 6 to 8 minutes to substantially completely gelatinize the rice grain of the paddy, rapidly cooling the gelatinized rice paddy to a temperature below 60° C., and drying the paddy in a current of warm dry air for a time interval providing a moisture content of 9% to 14% in the gelatinized rice grain of the paddy.

5. The method of processing rice having a natural moisture content of less than 17%–18% which comprises pre-heating the rice paddy superficially to a temperature of 90° to 110° C. in a steam atmosphere for a time interval, heating the rice grain thereof to a temperature not over 50° C., cooling the paddy rapidly and soaking the paddy in water at a temperature of 20° to 40° C. until a total water content approximating 29% is obtained in the rice grain, surface drying the paddy without heating the rice grain to over 50° C. and heating the rice paddy to a temperature within the range 60° to 120° C. in a moist atmosphere for a time interval required to gelatinize the rice grain to about 35%, quickly cooling the gelatinized paddy to below 60° C., and drying the paddy in a current of warm, dry air for a time interval providing a moisture content of 9% to 14% in the gelatinized rice grain of the paddy.

6. The method of claim 5, wherein the temperature of gelatinization is within the range 90° to 110° C.

7. The method of processing rice paddy having a natural moisture content of over 17%–18% but not over about 28% which comprises surface drying the paddy at 100°–110° C. to remove the surface adsorbed moisture from the paddy and to sterilize the same, steaming the surface dried rice paddy at 100°–110° C. under a steam pressure of 10–15 pounds for a time interval required to substantially completely gelatinize the rice grain and to increase its moisture content 6% to 8%, rapidly cooling the steamed paddy to below 60° C., and drying the cooled paddy in a warm, dry, air blast to lower the moisture content of the gelatinized rice grain to 9% to 14%.

8. The method of processing rice paddy to convert same into a gelatinized and dehydrated rice paddy having good storage properties and capable of further processing into desirable rice products which comprises surface drying the paddy to remove the surface adsorbed moisture, steaming the rice paddy when it has a natural and adsorbed moisture content of about 18% to 29% at 100°–110° C. in a pressure of steam within the range 10 to 15 pounds for a time interval, gelatinizing the rice grain without increasing the moisture content of the gelatinized grain to above about 35%, rapidly cooling the gelatinized paddy to below 60° C. and dehydrating the gelatinized grain to a moisture content of 9% to 14%.

9. The method of processing rice paddy having a natural moisture content of about 18% to 28%, which comprises passing said paddy directly in its natural moisture state to a drying medium whereby said paddy is subjected to a temperature of about 100°–110° C. to remove surface adsorbed moisture therefrom and to sterilize the same, then steaming the surface dried rice paddy at 100°–110° C. under a steam pressure of 10–15 pounds for a time interval required to substantially completely gelatinize the rice grain and to increase its moisture content 6% to 8%, rapidly cooling the steamed paddy to below 60° C., and drying the cooled paddy in a warm, dry air blast to lower the moisture content of the gelatinized rice grain to 9% to 15%.

10. The method of processing rice paddy having a natural moisture content of about 18% to 28% which comprises gelatinizing said paddy without prior soaking thereof and without increasing the moisture content of the gelatinized grain to above about 35%, rapidly cooling the gelatinized paddy to below 60° C., and drying the cooled paddy in a warm, dry air blast to lower the moisture content of the gelatinized rice grain to 9% to 15%.

11. The method of processing rice paddy having a natural moisture content of about 18% to 28% which comprises subjecting said paddy, without prior soaking thereof, to surface drying to remove the surface adsorbed moisture, steaming at about 100°–110° C. under a steam pressure of about 10–15 pounds for a time interval sufficient to substantially completely gelatinize the rice grain without increasing the moisture content of the gelatinized grain to above about 35%, rapidly cooling the steamed paddy to below about 60° C. and dehydrating the gelatinized grain to a moisture content of about 9% to 14%.

References Cited in the file of this patent

UNITED STATES PATENTS

| | | |
|---|---|---|
| 2,498,573 | Ozai-Durrani | Feb. 21, 1950 |
| 2,515,409 | Jones et al. | July 18, 1950 |
| 2,546,456 | Landon et al. | Mar. 27, 1951 |
| 2,592,407 | Fernandes | Apr. 8, 1952 |